(12) United States Patent
Fansler et al.

(10) Patent No.: US 8,740,256 B2
(45) Date of Patent: Jun. 3, 2014

(54) QUICK CONNECTOR ASSEMBLY

(75) Inventors: Douglas Milton Fansler, St. Clair, MI (US); Michael Richard Bucher, Clinton Township, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 217 days.

(21) Appl. No.: 13/100,849

(22) Filed: May 4, 2011

(65) Prior Publication Data
US 2012/0104746 A1    May 3, 2012

Related U.S. Application Data

(60) Provisional application No. 61/343,846, filed on May 4, 2010.

(51) Int. Cl.
*F16L 37/088* (2006.01)

(52) U.S. Cl.
USPC ............................................ 285/93; 285/321

(58) Field of Classification Search
CPC ... F16L 37/088; F16L 37/144; F16L 37/0841; F16L 37/0985; F16L 2201/10
USPC .................................................... 285/93, 321
See application file for complete search history.

(56) References Cited

U.S. PATENT DOCUMENTS

| 5,000,614 A | 3/1991 | Walker et al. |
| 7,845,684 B2 * | 12/2010 | Gaudin ........................... 285/93 |
| 8,240,716 B2 * | 8/2012 | Kerin et al. ..................... 285/93 |
| 8,336,919 B2 * | 12/2012 | Gillet et al. ..................... 285/93 |

FOREIGN PATENT DOCUMENTS

| JP | 08219352 | 8/1996 |
| JP | 11325361 | 11/1999 |
| JP | 2005180687 | 7/2005 |
| JP | 2006183764 | 7/2006 |

OTHER PUBLICATIONS

International Search Report for PCT/US2011/035267, Feb. 8, 2012, 3 pages.
Written Opinion for PCT/US2011/035267, Feb. 8, 2012, 4 pages.

* cited by examiner

*Primary Examiner* — James Hewitt
(74) *Attorney, Agent, or Firm* — Reising Ethington, P.C.

(57) ABSTRACT

A quick connector assembly that provides fluid communication between a first conduit and a second conduit. The quick connector assembly includes a housing and a retainer. The housing has a first end that connects with the first conduit, has a second end that connects with the second conduit, and has a fluid passage that extends between the first and second ends. The retainer is carried by the housing and has a portion located in the fluid passage of the housing.

17 Claims, 13 Drawing Sheets

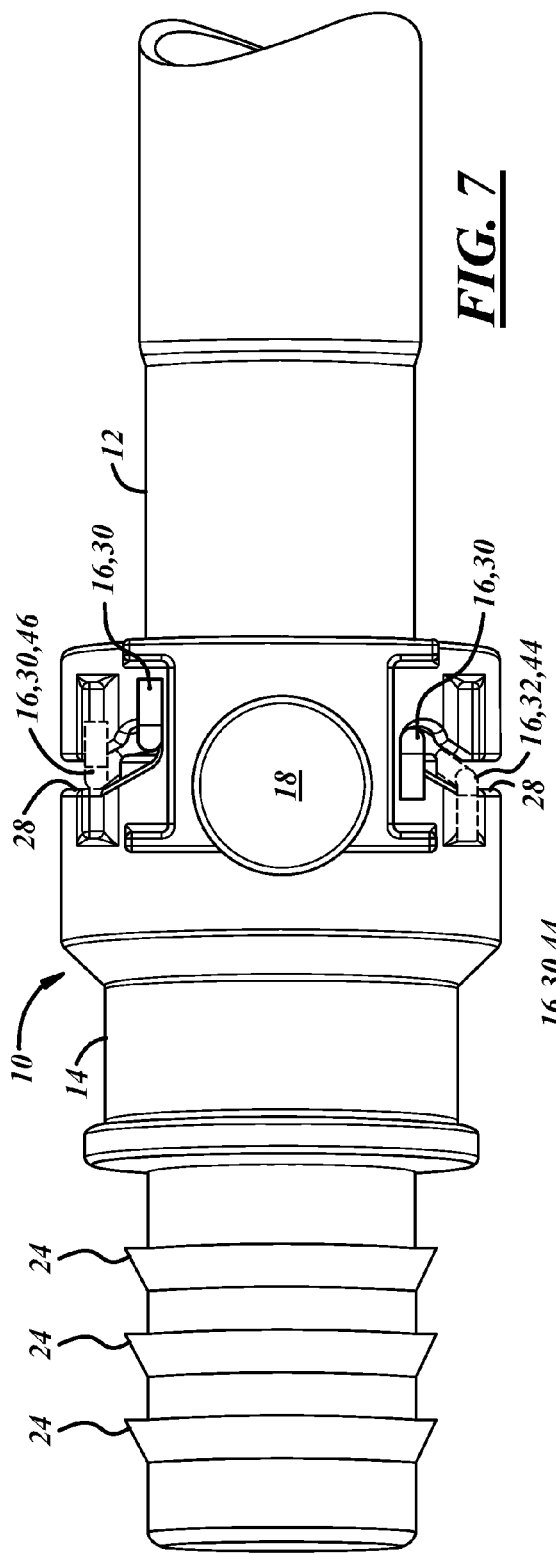
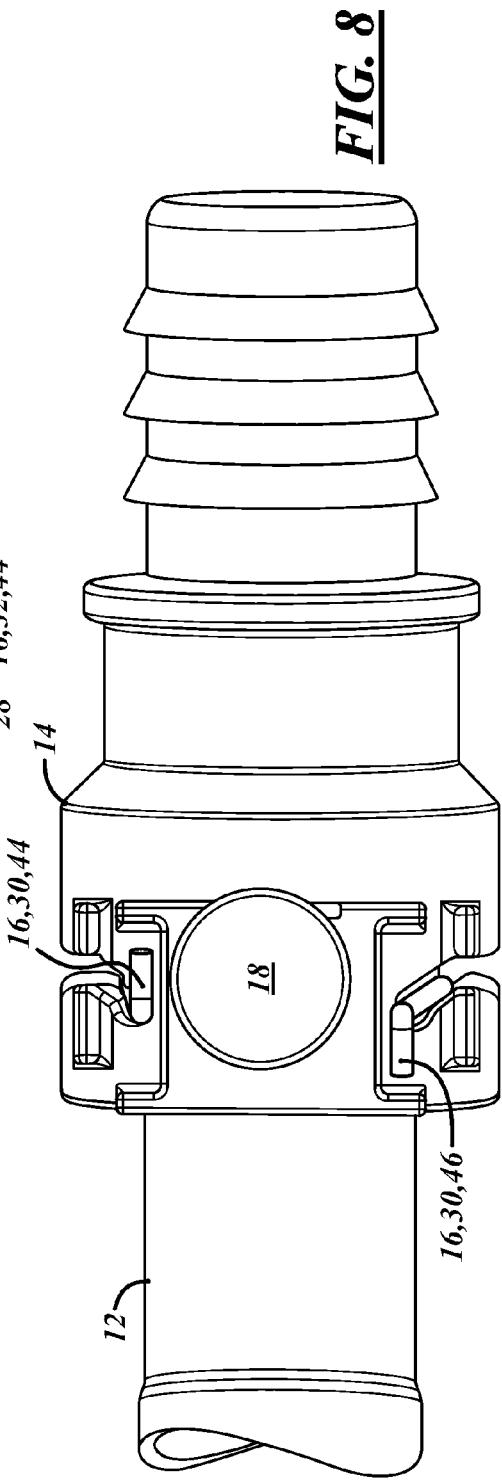

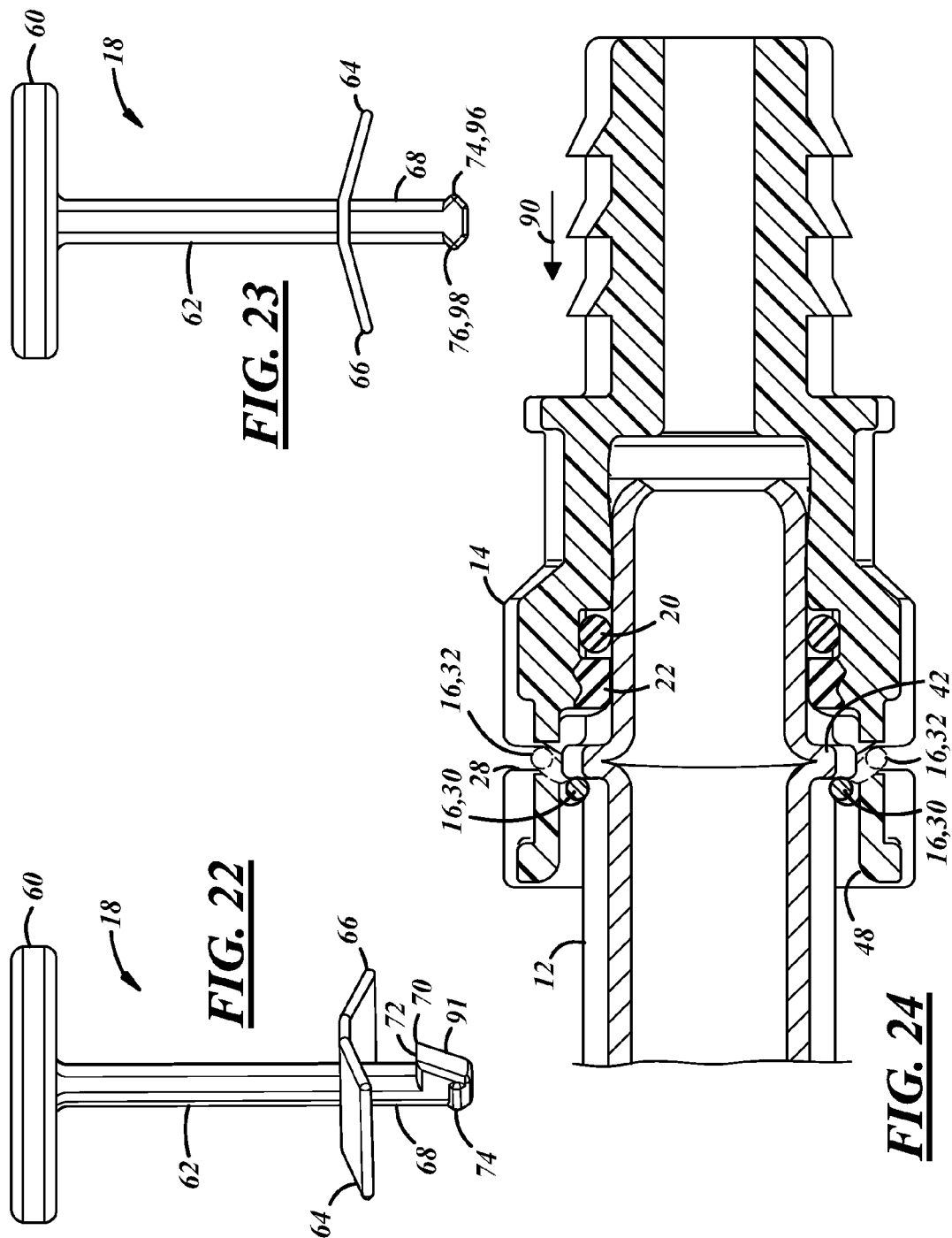

QUICK CONNECTOR ASSEMBLY

CROSS-REFERENCE TO RELATED APPLICATION

This application claims the priority of U.S. Provisional Application No. 61/343,846, filed May 4, 2010, the entire contents of which are hereby incorporated by reference.

TECHNICAL FIELD

This invention relates to quick connector assemblies that join fluid conduits in a substantially leak-proof connection.

BACKGROUND OF THE INVENTION

This section provides background information related to the present disclosure which is not necessarily prior art. Connection joints that join two fluid lines are currently known in the art. One limitation of some current connection joints is the necessity to use tools, such as screwdrivers, to tighten screws that secure one or both of the fluid lines together. Another limitation of some current connection joints is their tendency to give a user the impression that the fluid connection lines are securely joined together, when in fact they are not, thus potentially separating during the transfer of fluid within the lines and through the connection joint.

SUMMARY OF THE INVENTION

In accordance with an embodiment of the invention, there is provided a quick connector assembly including a housing and a retainer. The housing provides fluid communication between a first conduit and a second conduit. The first conduit has a flange. The housing has a first end that connects with the first conduit, and the housing has a second end that connects with the second conduit. The housing also has a fluid passage that extends between the first and second ends. The retainer is carried by the housing. The retainer has a portion that is located in the fluid passage of the housing. When connecting the housing and the first conduit, the flange of the first conduit makes contact with the portion of the retainer and displaces the portion outwardly with respect to the fluid passage of the housing. During further connection, the flange passes the portion of the retainer so that the portion springs inwardly against the first conduit. Abutment between the flange and the portion of the retainer inhibits separation of the housing and the first conduit.

In accordance with another embodiment of the invention, there is provided a quick connector assembly including a housing and a wire spring. The housing is constructed to provide fluid communication between a conduit and a hose. The conduit has a flange. The housing has a fluid passage, and the housing has an opening in a wall of the housing. The opening is open to the fluid passage. The wire spring is wrapped externally around a portion or more of the housing. The wire spring has a portion that is extended through the opening and that is located within the fluid passage of the housing. When the housing receives the conduit, the flange of the conduit makes contact with the portion of the wire spring, and the contact of the flange displaces the portion outwardly with respect to the fluid passage of the housing and also displaces the portion forwardly with respect to the direction of reception of the conduit. During further reception, the flange passes the portion of the wire spring so that the portion springs inwardly and rearwardly against the conduit. Abutment between the flange and the portion, and abutment between the portion and a surface of the opening, inhibits separation of the housing and the conduit.

In accordance with yet another embodiment of the invention, there is provided a quick connector assembly including a housing, a wire spring, and a tab. The housing is constructed to provide fluid communication between a conduit and a hose. The conduit has a flange. The housing has a first end that receives the conduit, and the housing has a second end that is inserted into the hose. The housing has a fluid passage that extends between the first and second ends. The housing further has a first opening, a second opening, and a through-hole. The wire spring is carried by the housing. The wire spring has a first leg that is extended through the first opening and that is located within the fluid passage. The wire spring has a second leg that is extended through the second opening and that is located within the fluid passage of the housing. The tab has a first portion that is extended through the through-hole and that is located within the fluid passage at a position that is forward of the first and second legs with respect to the direction of reception of the conduit. The tab has a second portion that is located exteriorly of the housing. When the housing receives the conduit, the flange makes contact with the first and second legs and displaces the first and second legs outwardly with respect to the fluid passage, and displaces the first and second legs forwardly with respect to the direction of reception of the conduit. During further reception, the flange passes the first and second legs so that the first and second legs spring inwardly and rearwardly against the conduit. The flange contacts the first portion of the tab and displaces the tab outwardly with respect to the fluid passage of the housing. And during further reception, the flange passes the first portion of the tab.

BRIEF DESCRIPTION OF THE DRAWINGS

Preferred exemplary embodiments of the invention will hereinafter be described in conjunction with the appended drawings, wherein like designations denote like elements, and wherein:

FIG. 7 is an enlarged top view of the connector assembly of FIG. 1 joined to a conduit;

FIG. 8 is an enlarged top view of the connector assembly of FIG. 1 joined to a conduit;

FIG. 22 is a perspective view of an insertion verification tab depicting flexible tabs, a hook, and nodules;

FIG. 23 is a rear view of an insertion verification tab depicting flexible tabs and nodules;

FIG. 24 is a cross-sectional view of the connector assembly of FIG. 1 and a conduit with the conduit engaging a retainer.

DETAILED DESCRIPTION OF THE PREFERRED EMBODIMENTS

Figure 1:
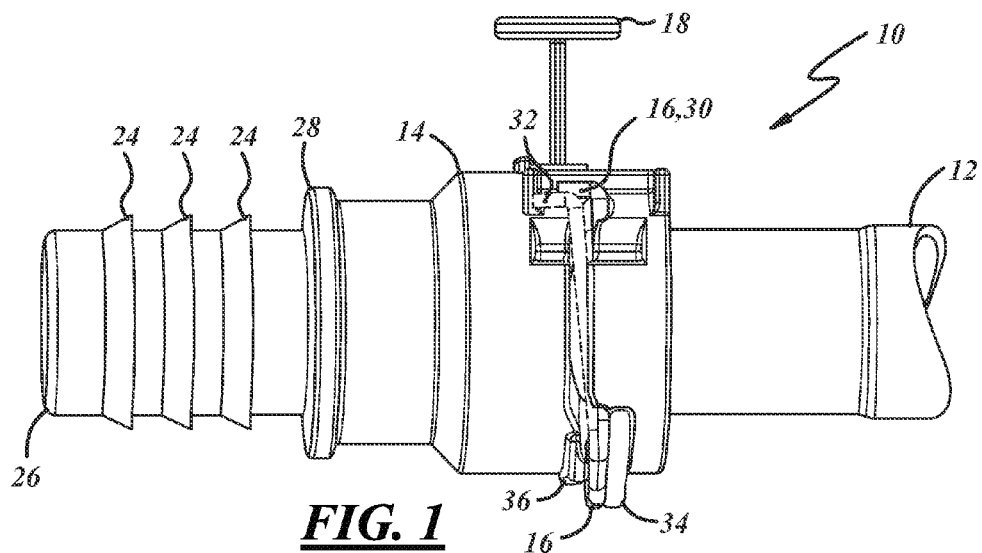
FIG. 1 is a right side view of an embodiment of a connector assembly joined to conduit.
Figure 2:
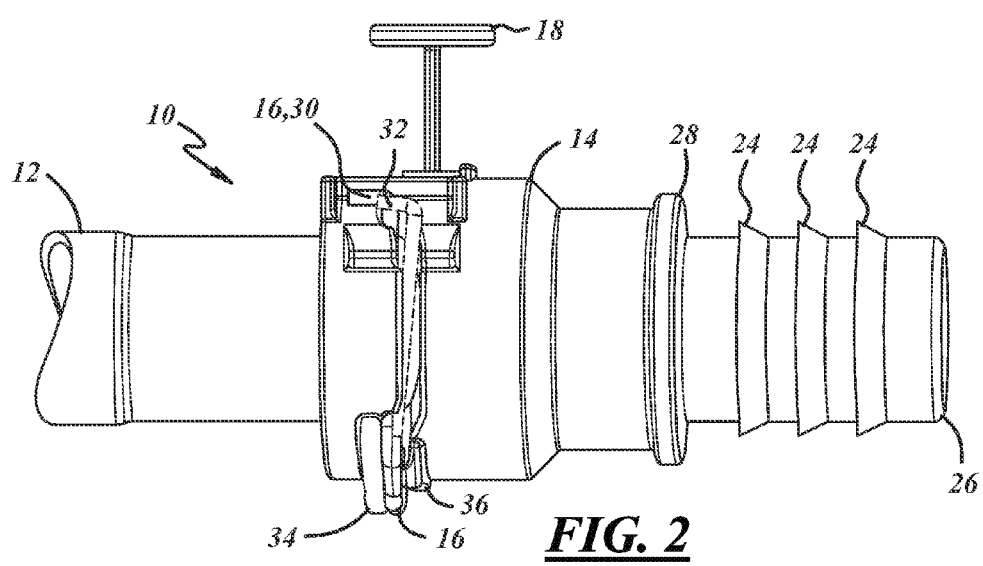
FIG. 2 is a left side view of the connector assembly of FIG. 1 joined to a conduit.
Figure 3:
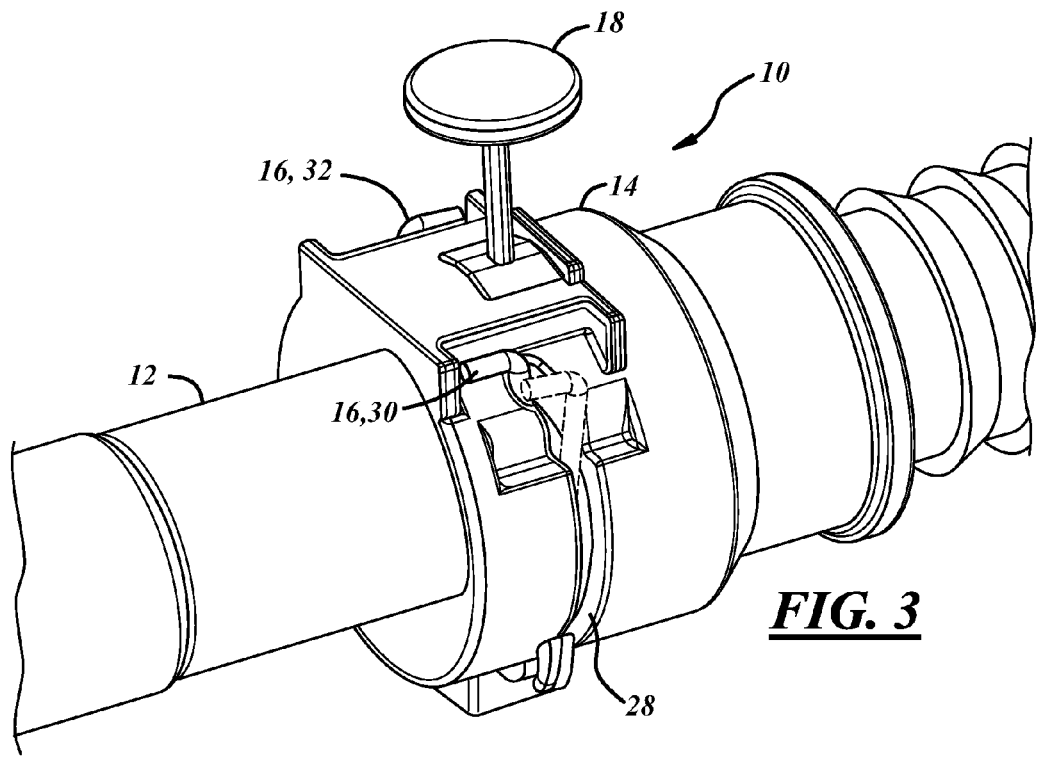
FIG. 3 is a perspective view of the connector assembly of FIG. 1 joined to a conduit.
Figure 4:
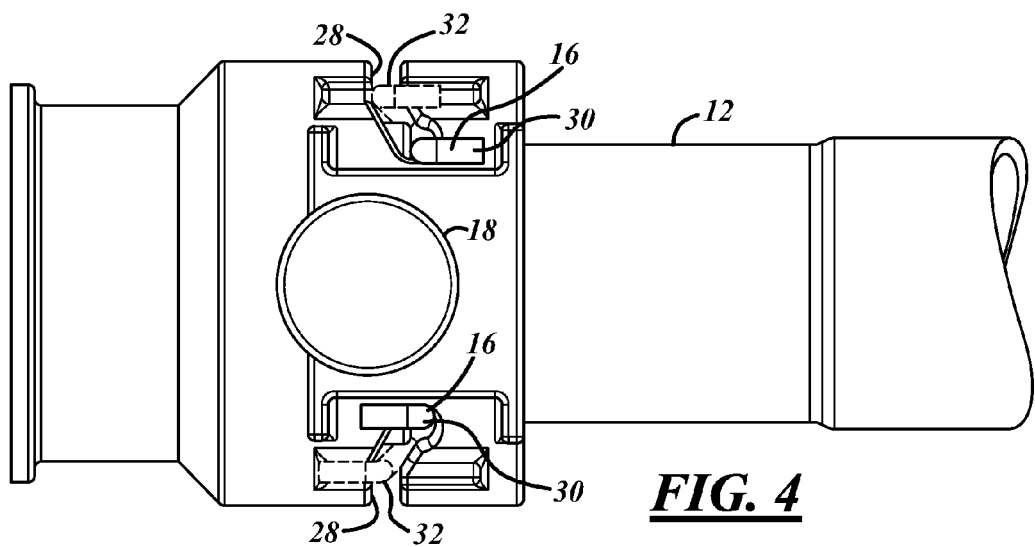
FIG. 4 is a top view of the connector assembly of FIG. 1 joined to a conduit.
Figure 5:
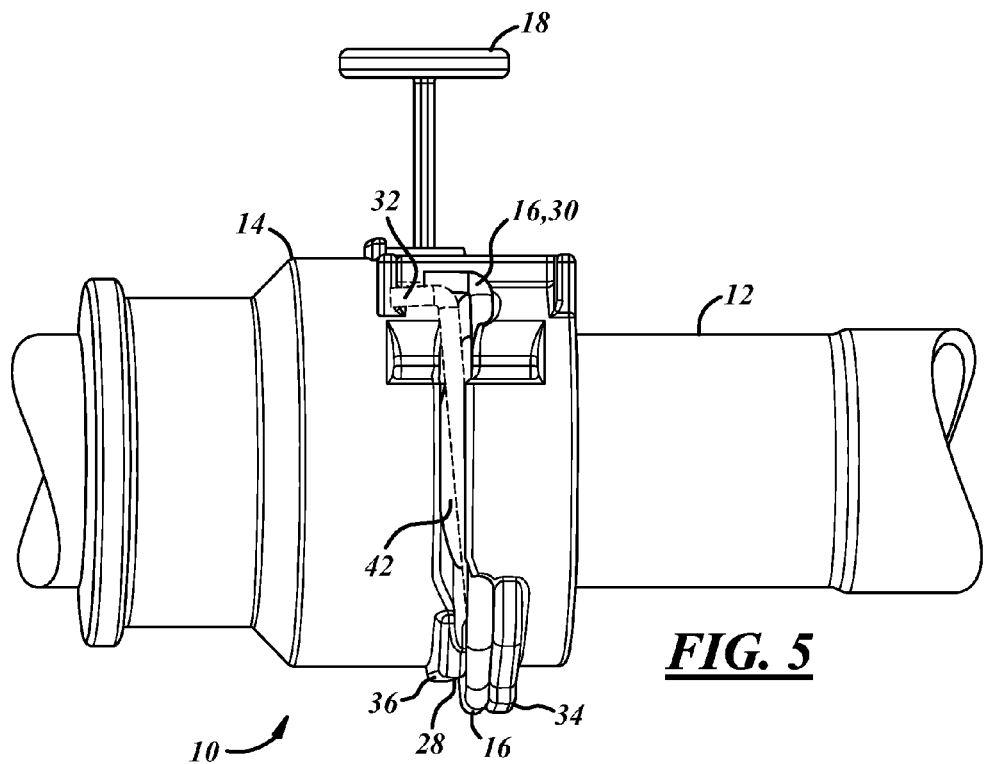
FIG. 5 is an enlarged side view of the connector assembly of FIG. 1 joined to a conduit.
Figure 6:
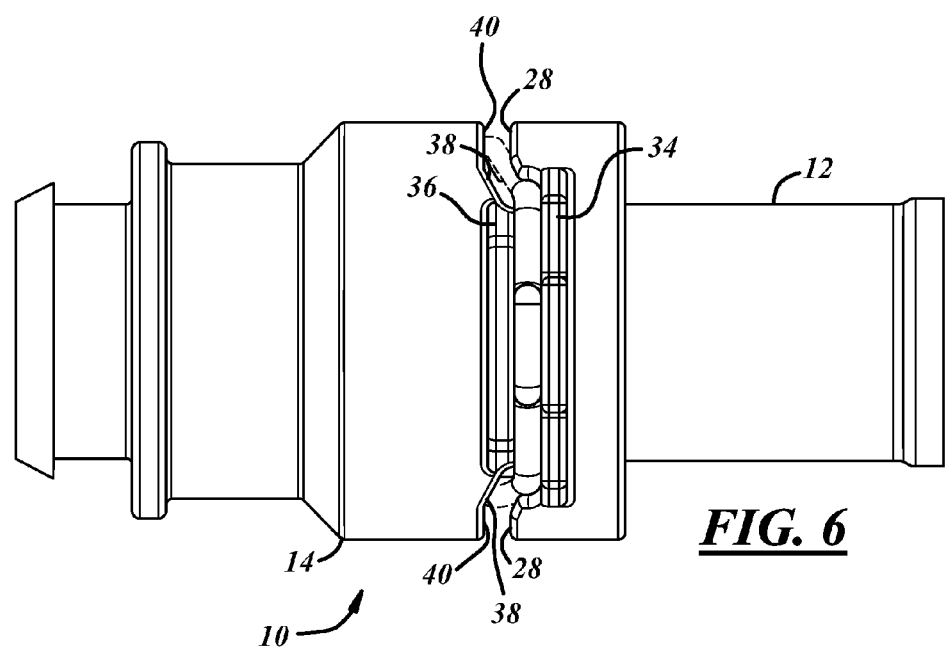
FIG. 6 is an enlarged bottom view of the connector assembly of FIG. 1 joined to a conduit.
Figure 12:
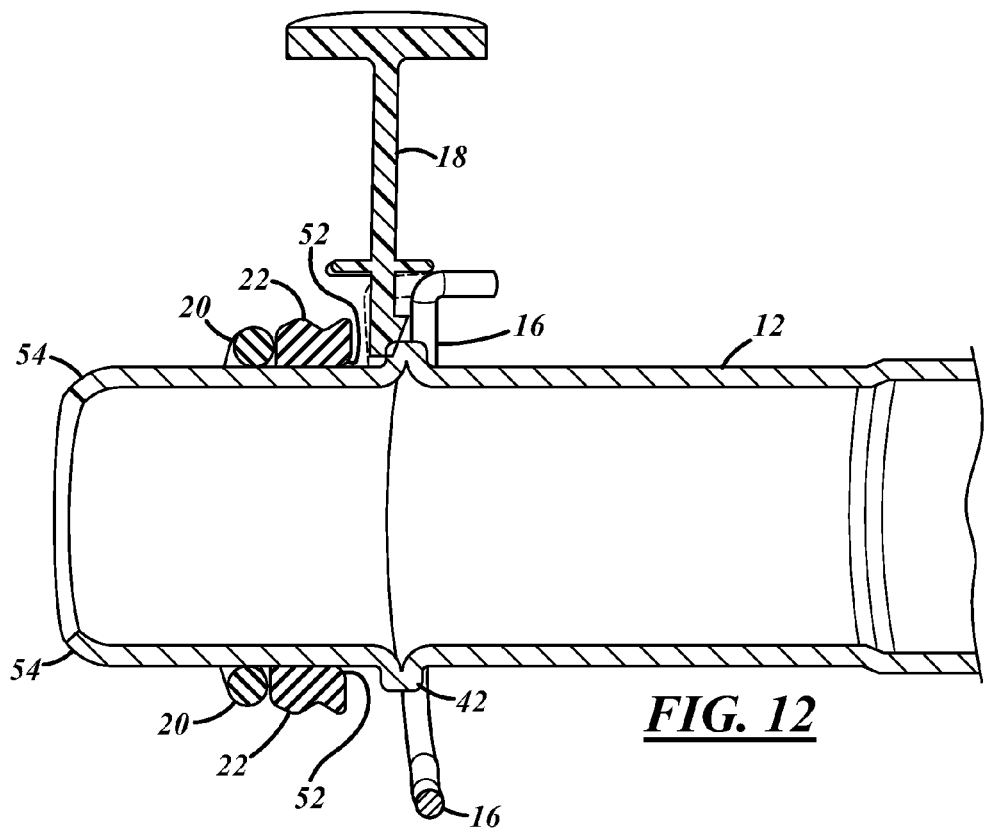
FIG. 12 is a cross-sectional view of an O-ring, bushing, retainer, insertion verification tab, and conduit, according to an embodiment of a connector assembly.
Figure 13:
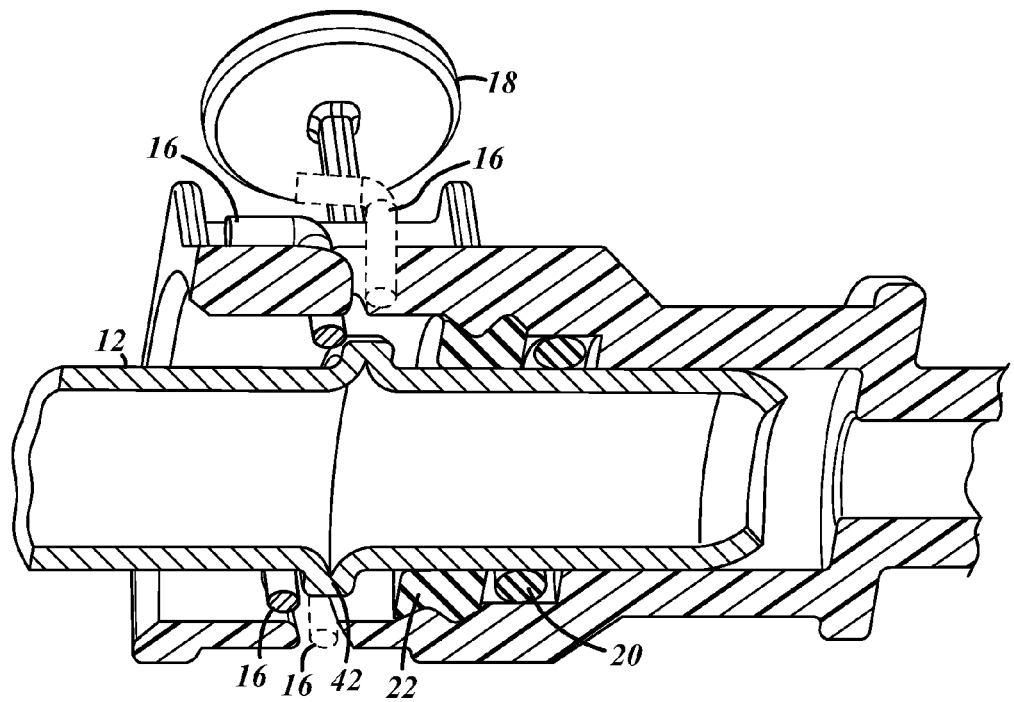
FIG. 13 is a cross-sectional view of the connector assembly of FIG. 1 and conduit residing within the connector assembly.

With reference now to FIGS. 1-24 of the drawings the operative workings of embodiments of the invention will now be described more fully. In general, a quick connector assembly is used to facilitate the transition between two conduits, in one example a metal pipe and a rubber hose, without the use of a hose clamp; though in some embodiments a hose clamp can be used. Turning first to FIGS. 1 and 2, a quick connector assembly 10 is depicted with a conduit 12 residing within the connector assembly 10. In one embodiment, the connector assembly 10 employs a housing 14, a retainer 16, an insertion verification tab or tab 18, an O-ring 20 (FIG. 13), and a bushing 22 (FIG. 13). The conduit 12 is inserted into and locks within the connector assembly 10. The connector assembly 10 may be utilized to connect a fluid transfer line, such as a rubber hose (not depicted), to a nipple with ridges or barbs 24 around a hollow inlet 26. The hollow inlet 26 may also be used as an outlet. Continuing, the housing 14 has a conduit or hose stop 27 against which a conduit or hose may reside when installed over the barbs 24. The housing 14 can be made of a plastic material such as nylon 66, 33% glass filled; other materials could be suitable and could be used. The housing 14, as a molded plastic structure may have multiple features molded into it in order to facilitate the acceptance of the hollow conduit 12, such as a metal or plastic pipe, within the interior of the housing 14. More specifically, and with reference to FIGS. 3-6, the housing 14 may employ an opening or groove 28 that passes through the wall thickness of the housing 14 and around a majority of the circumference of the housing 14. FIG. 6 depicts the groove 28 on the bottom of the housing 14. The groove 28 is molded into the housing at an angle, that is, the groove 28 is not perpendicular to the longitudinal centerline of the fluid passage through the housing 14. The angle at which the groove 28 is molded into the housing facilitates the direction of movement of the retainer 16 within the groove 28. More specifically, the retainer 16, which may be a piece of steel such as spring steel or wire, resides in a first position depicted with numeral 30, before insertion of the conduit 12.

Upon insertion of the conduit 12 into the connector assembly 10 as depicted in FIGS. 1-5, the retainer 16 will move according to the angle of the groove 28 from the position 30 to the position 32 as the conduit 12 makes contact with the retainer 16. From the position 30 and to the position 32, the retainer 16 is displaced outwardly with respect to a fluid passage 48 and is displaced forwardly with respect to the direction of insertion of the conduit 12. A first exterior wall 34 of the connector assembly 10 provides a surface for the retainer 16 to bear against as the conduit 12 is pressed into the connector assembly 10 and against the retainer 16. A second exterior wall 36 may also reside on an outside of the connector assembly, parallel to the first exterior wall 34, and together with the first exterior wall 34, form part of the groove 28, within which the retainer 16 may reside. Between the exterior walls 34, 36 the groove is not though to the fluid passage 48 of the connector assembly 10 and is rather located externally of the fluid passage 48 and externally of the housing 14; however, other portions of the groove 28 are through the wall of the connector assembly 10 so that the retainer 16, in position 30 and position 32, may make physical contact against the conduit 12.

Figure 10:
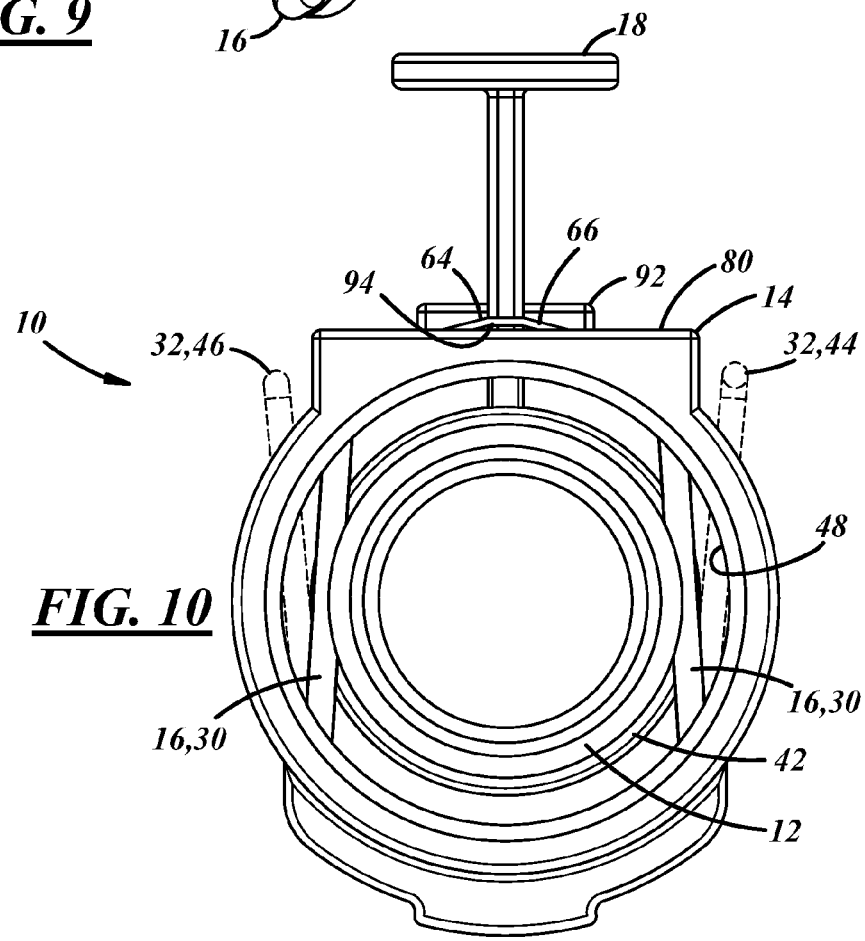
FIG. 10 is an end view of the connector assembly of FIG. 1 from the end of the conduit that is connected to the connector assembly.

FIG. 6 clearly depicts a bottom view of the connector assembly 10 and the groove 28, and more specifically, depicts how a first portion 38 of the groove 28 is formed at a non-perpendicular angle relative to a longitudinal axis of the conduit 12 and the connector assembly 10, while a second portion 40 of the groove 28 is formed at a right angle to, or is perpendicular to, the longitudinal axis of the conduit 12 and the connector assembly 10. Similarly, the top view of the connector assembly 10 of FIG. 7 depicts how the retainer 16 moves within the groove 28 of the connector assembly 10 during insertion of the conduit 12 into the connector assembly 10. More specifically, before the conduit 12 is inserted into the connector assembly 10, the one-piece retainer 16 is in position 30. When the conduit 12 is inserted into the connector assembly 10, a flange 42 (FIG. 10) of the conduit 12 contacts a portion or more of the retainer 16, which is in position 30. As insertion of the conduit 12 continues into the connector assembly 10, the flange 42 pushes, urges, and displaces the retainer 16 from position 30 into position 32. The retainer moves within the groove 28 and between its surfaces, which initially is at an angle that is not ninety degrees, relative to the longitudinal axis of the conduit 12. As the conduit 12 continues even further into the connector assembly 10, the retainer 16 reaches the end of the angled portion of the groove 28 and may then proceed within the groove 28 at a ninety degree angle to the conduit 12, as depicted in FIG. 10. As soon as prongs 44, 46 of the retainer 16 move outwardly (toward the outside diameter of the connector assembly 10) such that the distance between the prongs 44, 46 is larger than or equal to the diameter of the flange 42, the retainer 16 and prongs 44, 46 move inwardly and spring back into the position 30, as depicted in FIGS. 7 and 8.

Figure 9:
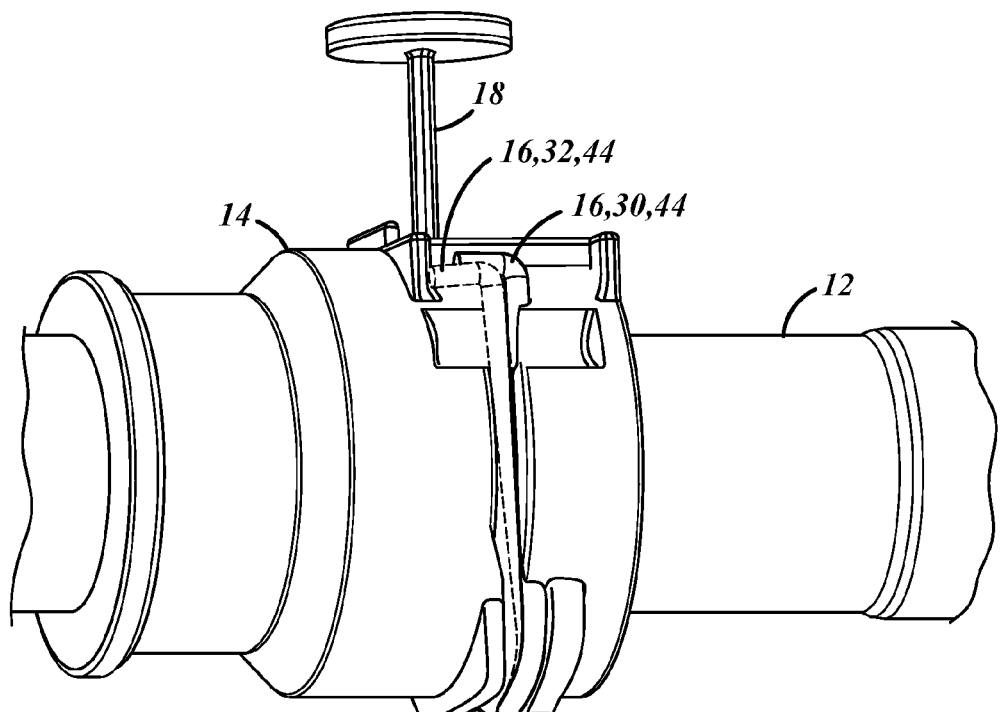
FIG. 9 is an enlarged perspective view of the connector assembly of FIG. 1 joined to a conduit.

FIG. 9 depicts two positions of the retainer 16. The first position 30 depicts the first prong 44 in a position in which the conduit 12 has either not yet been inserted or a position in which the conduit 12 has been fully inserted. The second position 32 of the prong 44 of the retainer 16 depicts a position in which the conduit 12 is undergoing insertion. Stated differently, when the prongs 44, 46 of the retainer 16 are at position 32, the conduit is undergoing insertion and when the prongs 44, 46 of the retainer 16 are at position 30, insertion and installation either has not started or is complete.

Figure 14:
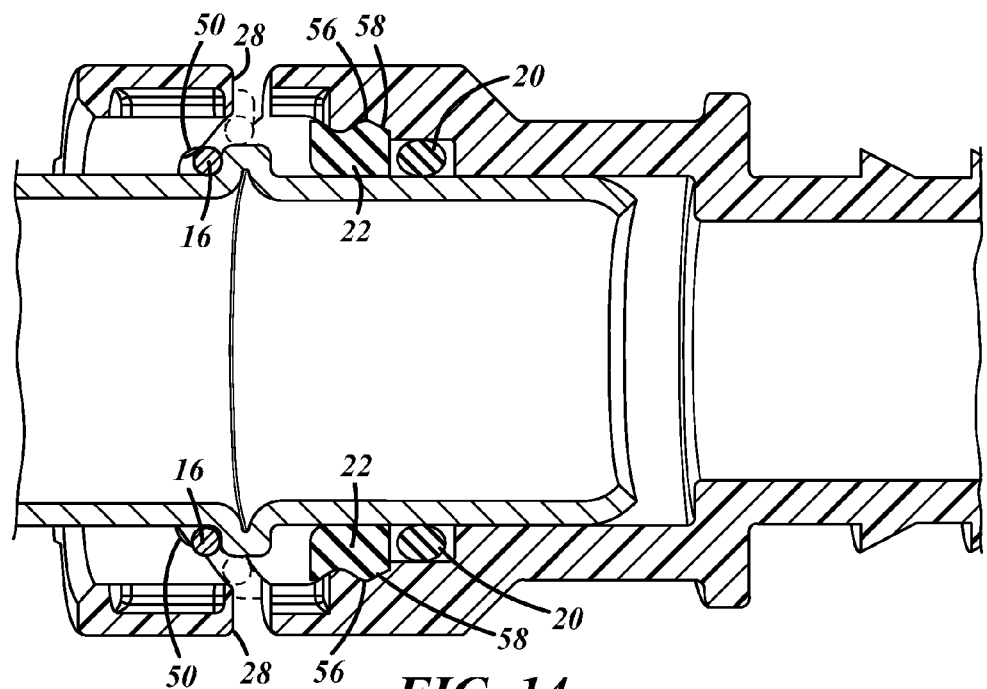
FIG. 14 is a cross-sectional view of the connector assembly of FIG. 1, including a retainer, and a conduit locked within the connector assembly.

FIG. 10 depicts the fully inserted position of the conduit 12 with the retainer 16 in position 30 blocking the flange 42 of the conduit 12 from exiting the passage 48 of the housing 14 and therefore inhibiting separation of the housing 14 and the conduit 12. That is, the retainer 16 is between the flange 42 and the exit of the passage 48 of the housing 14. FIG. 10 also depicts the position 32 of the retainer 16 with its prongs 44, 46 location at a position in order to permit the flange 42 to pass in order for the retainer to assume the position 30 and lock the flange 42 and conduit 12 within the housing 14. With reference again to FIG. 7, another embodiment of the connector assembly 10 will be explained. More specifically, the groove 28 is angled so that after installing the conduit 12 into the housing 14 to a depth that permits the conduit 12 to lock behind the retainer 16, as depicted in FIGS. 10 and 14, if the conduit 12 is pulled or forced in the opposite rearward direction, or non-insertion direction, an end of surface 50 of the groove 28 in the housing 14 will prevent the retainer 16 from spreading apart and outwardly and rearwardly, as is necessary for insertion of the conduit 12, as described above. FIGS. 12 and 13 also depict, in perspective cross-sectional views, how the retainer 16 resides between the exit of the passage 48 of the housing 14 and the flange 42 of the conduit 12. In this embodiment, because the retainer 16 is a single piece of material, such as a stainless steel spring wire, the retainer 16 maintains its shape and position against the flange 42 unless forced by contact in another direction, as described above in connection with insertion of the conduit 12 into the housing 14.

FIG. 12 also depicts another embodiment of the present teachings. More specifically, the bushing 22 has a rounded or beveled edge 52 that permits easy insertion of the conduit 12 into the passage 48 of the housing 14. Similarly, the conduit 12 has a rounded or beveled end 54 that will assist in directing the conduit 12 into the connector assembly 10, such as if the beveled end 54 strikes the beveled edge 52 of the bushing 22. Next to the bushing 22, the O-ring 20 resides to create a fluid-tight seal between the conduit and the housing 14. The seal that the O-ring 20 provides prevents fluid from passing beside and around the O-ring 20. Because the O-ring 20 compresses, it also assists in maintaining the position of the conduit 12 within the housing 14 by maintaining a constant and equal force against the conduit 12 where the O-ring 20 contacts the conduit 12. FIG. 14 also shows that the O-ring 20 and bushing 22 maintain their positions within the housing 14 during insertion and removal of the conduit 12. More specifically, FIG. 14 depicts a ridge 56 that protrudes toward a centerline of the housing 14. The ridge 56 mates with or fits into a valley 58 of the bushing 22 and prevents movement fore and aft within the housing 14, or stated differently, movement back-and-forth in the direction of the centerline of the conduit 12 and housing 14 is restricted or prevented. With continued reference to FIG. 14, because the O-ring 20 is located against the bushing 22 on one side, and the housing structure itself on the other side, the O-ring 20 is prevented from moving within the housing 14.

Figure 11:
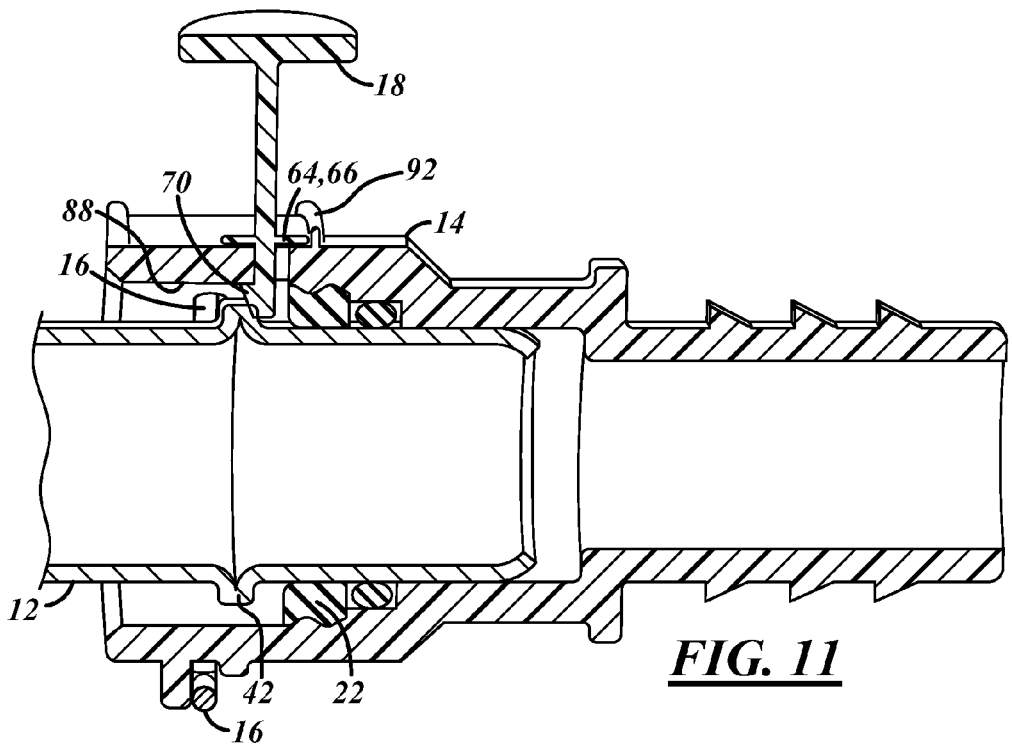
FIG. 11 is a cross-sectional view of the connector assembly of FIG. 1 joined to a conduit.
Figure 15:
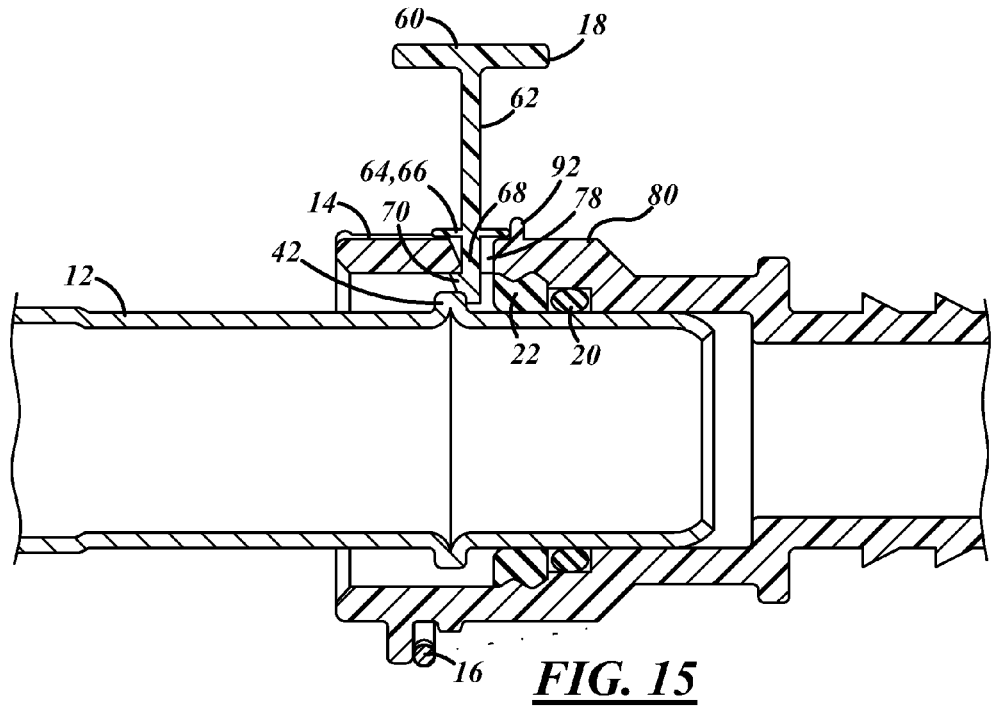
FIG. 15 is a cross-sectional view of the connector assembly of FIG. 1 with a conduit contacting an insertion verification tab within the connector assembly.
Figure 16:
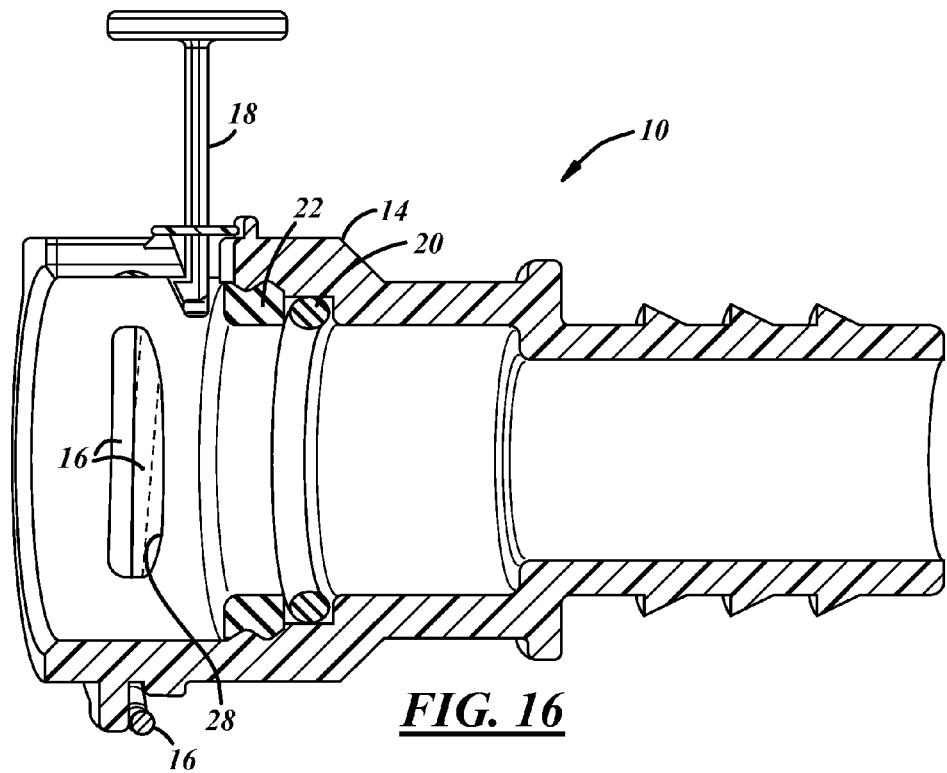
FIG. 16 is a cross-sectional view of the connector assembly of FIG. 1 depicting an O-ring, bushing, retainer, and insertion verification tab.
Figure 17:
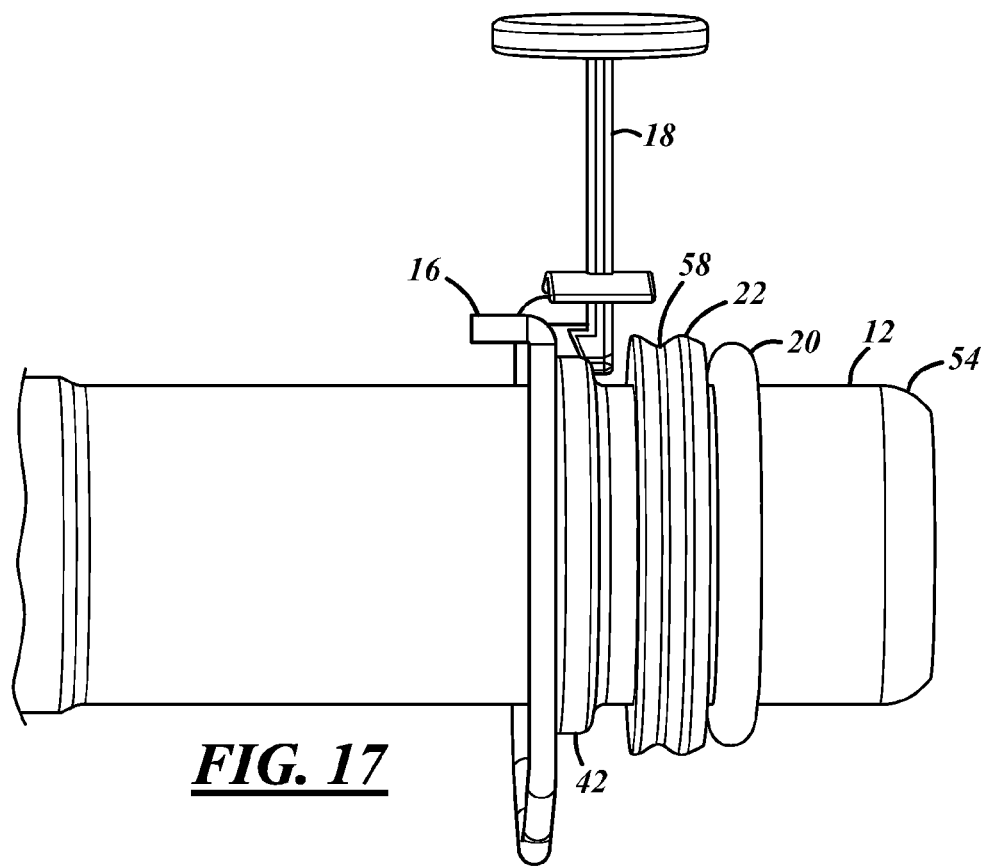
FIG. 17 is a side view of a conduit around which an O-ring, busing, retainer, and insertion verification tab may be situated, relative to the conduit.

Turning now to FIGS. 15-20, an explanation of the insertion verification tab 18 will be presented. With reference first to FIG. 22 and FIG. 23, the insertion verification tab 18 has a top button 60, a stalk 62, a first tab 64, a second tab 66, a tension post 68, a hook 70 with a land 72, a first nodule 74, and a second nodule 76. When viewed in the rear view of FIG. 23, the first tab 64 and second tab 66 are molded in an arcuate configuration to impart tension in the tension post 68 when the tabs 64, 66 are pressed flat against the housing in their installed position, as depicted in FIG. 11 and FIG. 15. Because the tabs 64, 66 are flexible, they act as a spring to place the tension post 68 in tension when the insertion verification tab 18 is in its installed position as in FIG. 11 and FIG. 15. Tension results in the tension post 68 between the tabs 64, 66 and the hook 70 because the hook 70 is situated under and against part of the housing 14 when the tabs 64, 66 are in flexure and compressed against the top surface of the housing 14. With the tabs 64, 66 trying to unflex and relax to their unstressed state, but being prevented from doing so by the position of the hook 70 under and against an interior surface of the housing 14, the tension post 68 is placed into constant tension. Continuing when in its installed position, the insertion verification tab 18 passes through a hole 78 (FIG. 19) in the top of the housing 14 and the tabs 64, 66 abut against a vertical wall perpendicular to a top surface 80 of the housing 14. As depicted in FIG. 15, the conduit 12 is not yet fully inserted into the passage 48 of the housing 14. For clarity, FIG. 16 depicts the relative positions of the connector assembly 10, including the housing 14, insertion verification tab 18, O-ring 20, bushing 22, retainer 16, and groove 28 in the housing 14 are depicted without the conduit 12. Similarly, FIG. 17 depicts the relative positions of the conduit 12, insertion verification tab 18, O-ring 20, bushing 22, and retainer 16 without the housing 14.

Figure 18:
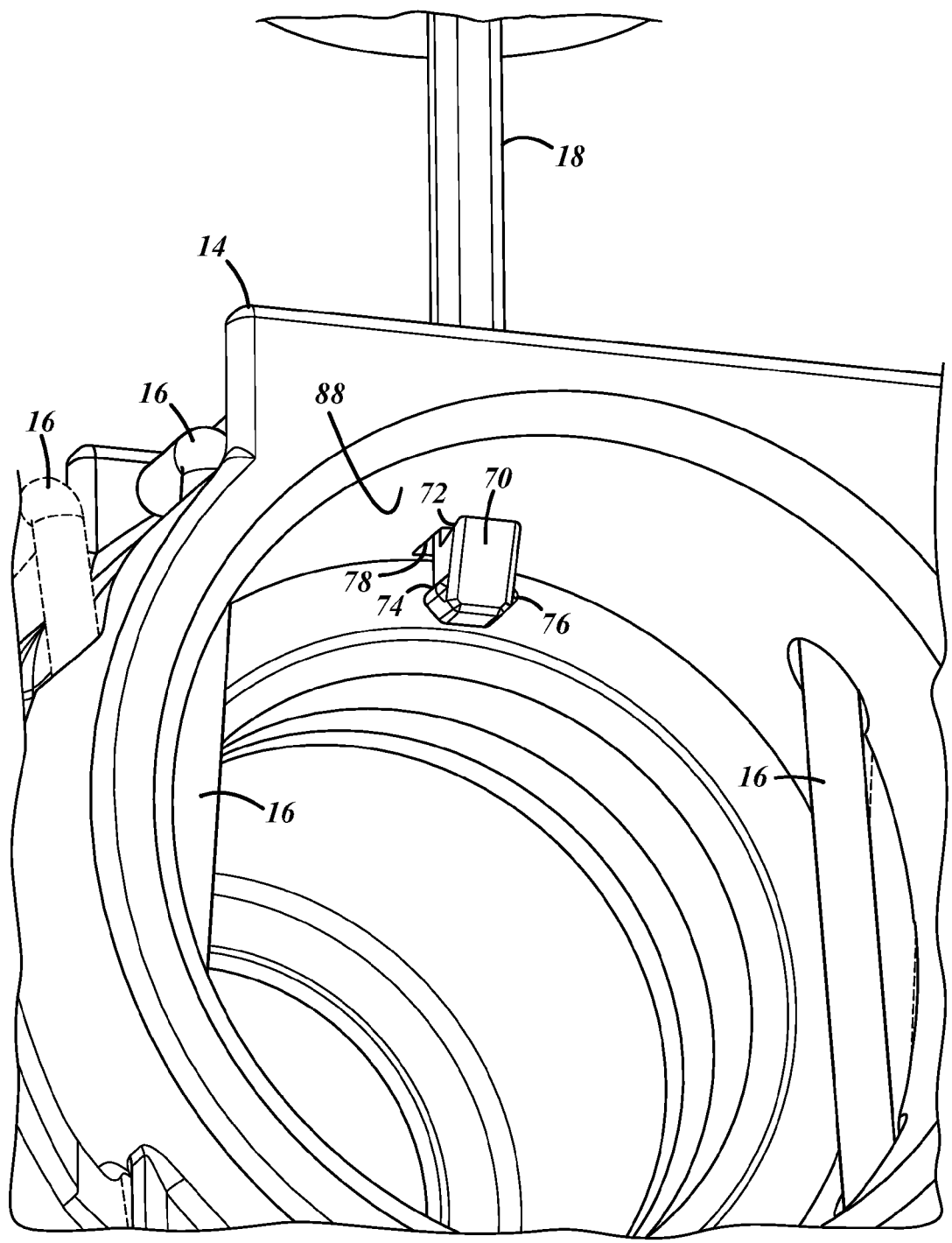
FIG. 18 is an enlarged view of the connector assembly of FIG. 1 depicting a hole through which an insertion verification tab can pass.
Figure 21:
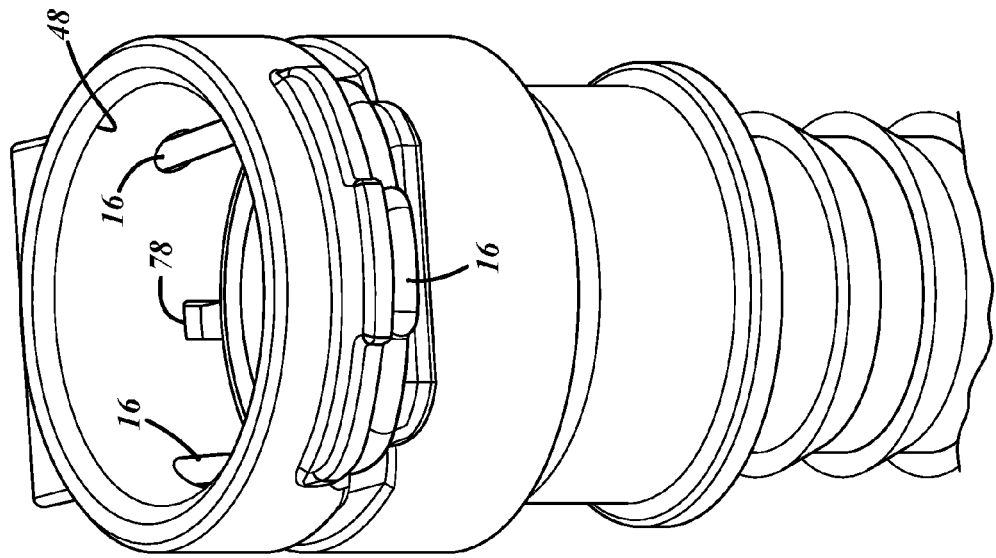
FIG. 21 is a perspective view of the connector assembly of FIG. 1 depicting passage through which an insertion verification tab can pass.

FIG. 18 is an enlarged view of the housing 14 within which the hole 78 through which the insertion verification tab 18 passes. The hole 78 is located through the top wall and inside diameter 82 of the housing 14. As depicted, the land 72 of the hook 70 of the insertion verification tab 18 resides against the inside diameter of the passage 48 of the housing 14. FIG. 18 also depicts the first nodule 74 and the second nodule 76 at the end of the insertion verification tab 18. The nodules 74, 76 in conjunction with the insertion verification tab 18 will be explained later.

Figure 19:
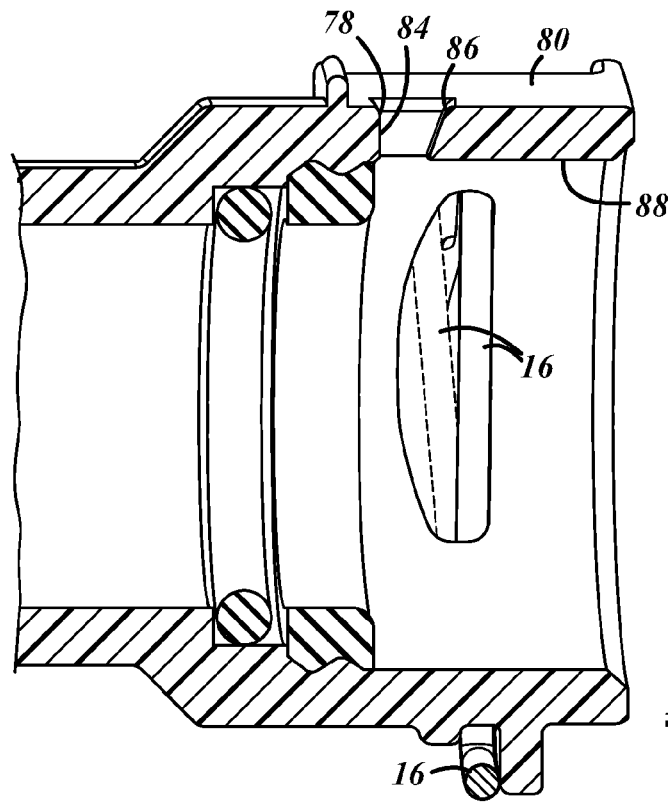
FIG. 19 is a cross-sectional view of the connector assembly of FIG. 1 depicting a passage through which the insertion verification tab can pass.
Figure 20:
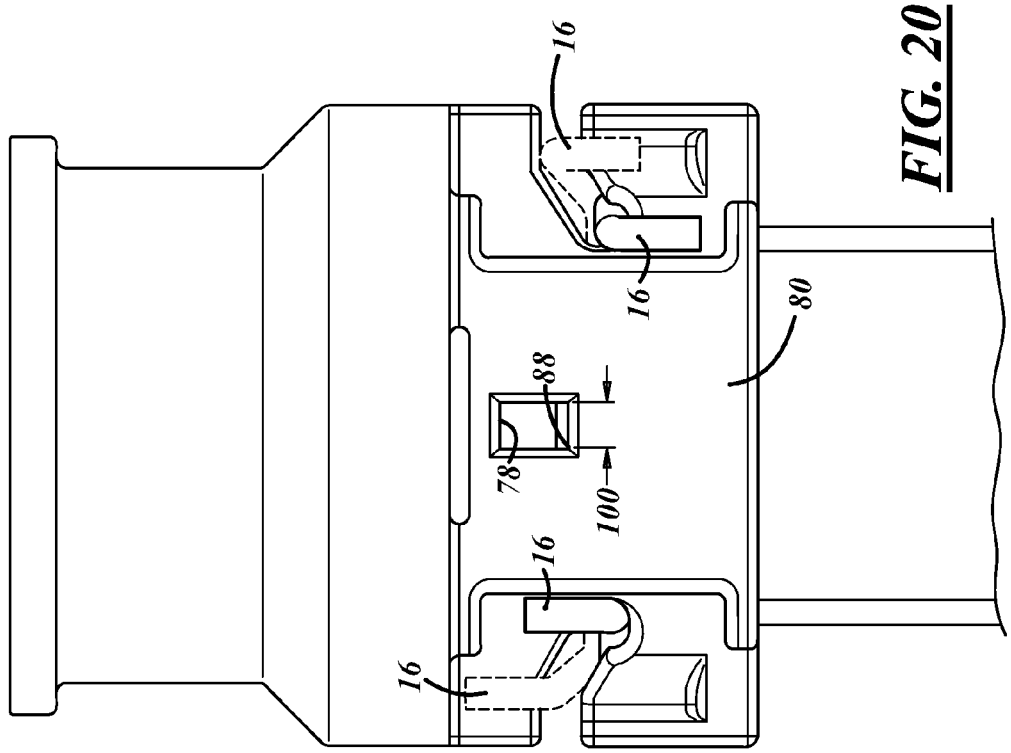
FIG. 20 is a top view of the connector assembly of FIG. 1 depicting a passage through which an insertion verification tab can pass.

Turning now to FIG. 19, details of the hole 78 in the housing 14 through which the insertion verification tab 18 passes will be described. More specifically, the hole 78 is in the outer or exterior wall of the housing 14 and in one embodiment is a through hole that passes from inside the passage 48 of the housing 14 and through the top surface 80 of the housing 14. The hole 78 is square as viewed from the top surface 80, as depicted in FIG. 20, but other shapes are possible. Continuing with FIG. 19, the hole 78 is molded such that not all opposing sides are parallel. More specifically, as depicted in FIG. 19, a first wall 84 is perpendicular to the longitudinal axis of the housing 14 while its opposing or second wall 86 is not. The second wall 86 is closer to the first wall 84 deeper into the hole 78; that is, the hole size is larger at the top surface 80 and decreases with the depth of the hole 78 through the wall of the housing 14. One reason for a tapered hole that is larger at one end, such as at the exterior surface of the housing, of the hole 78 than the other end, such as at an interior surface 88 of the housing 14, of the hole 78 will now be explained.

With reference to FIG. 16, before inserting the conduit 12 into the connector assembly 10, the insertion verification tab 18 can be in place through the hole 78 of the housing 14, and can be situated as depicted. Next, the conduit 12, with its rounded or beveled end 54 first, is inserted into the connector assembly 10, and more specifically, into the passage 48 of the housing 14. As the conduit 12 is pushed deeper into the housing 14, the flange 42 will eventually contact the retainer 16, as depicted in FIG. 24. More specifically, the flange 42 first contacts the retainer 16 when the retainer 16 is in position 30. Then due to the angle of the groove 28 as it is molded from the exterior of the housing 14 to the conduit 12, the retainer 16 is moved outwardly and forwardly, and away from the conduit 12, toward the exterior or outside diameter of the housing 14. The retainer 16 moves to position 32, as depicted in FIG. 24, when the conduit 12 is nearly fully inserted. As depicted in FIG. 24, the retainer 16 is spread or separated to its largest degree when the retainer 16 is contacting the outside diameter of the flange 42. Next, upon pushing the conduit 12 a little farther into the passage 48 of the housing 14, the retainer will again move and spring into position 30. With the conduit 12 fully pushed into the housing 14, and the retainer 16 in position 30, the flange 42 is locked between the retainer 16 in position 30 and the bushing 22. Thus, even if the conduit 12 is pulled in the rearward direction of arrow 90, the retainer 16 will prevent the removal of the conduit 12. More specifically, because the groove 28 is angled, when the conduit 12 is moved in direction 90, the flange 42 will actually direct the retainer 16 into the conduit 12 instead of away from the conduit 12, which would be necessary to remove the conduit. Thus, the connector assembly 10 has a conduit locking and snapping feature that functions using the flange 42, retainer 16, and angled groove 28 molded completely through the housing 14 wall around much of the retainer.

While the above structure and method of conduit 12 insertion ensures that the conduit 12 is locked within the housing 14, the insertion verification tab 18 permits a user to actually see that the conduit 12 is locked in place. Stated differently, the insertion verification tab 18 provides visual verification to a user that the conduit 12 is locked into place within the housing 14. More specifically, FIG. 11 depicts a cross-sectional view of the relationship between the housing 14, conduit 12, retainer 16, and the insertion verification tab 18. More specifically, when the flange 42 of the conduit 12 strikes the hook 70 of the insertion verification tab 18, the flange 42 has already outwardly biased the retainer 16, as explained above, and passed by the retainer 16 to cause the retainer 16 to snap, click, or move into the position depicted in FIG. 11, which is on one side of the flange 42, with the hook 70 being on the opposite side of the flange 42. As a user continues to push the conduit 12 into the housing 14, the tapered front portion 91 (FIG. 22) of the insertion verification tab 18 contacts the flange 42 of the conduit and the hook 70 is forced off of the interior surface 88 (FIG. 11 and FIG. 18). When the hook 70 is forced from the interior surface 88 of the housing 14 due to the force of the flange 42 on the tapered front portion 91 of the insertion verification tab 18, the tension in the tension post 68, together with the stored energy in the first tab 64 and second tab 66, causes the hook 70 to pull into or move into the hole 78. When the hook 70 moves into the hole 78, the entire insertion verification tab 18 moves away from the top surface 80 of the housing 14. More specifically, and to indicate to an observer that the conduit flange is securely stowed between the retainer 16 in position 30 and the bushing 22, the first tab 64 and the second tab 66 move from their compressed and flattened position, as depicted in FIG. 11 and FIG. 16, to their unstressed and arched position depicted in FIG. 10. To assist in guiding the tabs 64, 66 into and away from the housing 14, a top wall 92 protrudes perpendicularly from the top surface 80. When a user can physically view a gap 94 between top surface 80 and the tabs 64, 66, then the user knows that the land 72 of the hook 70 has been moved from the interior surface 88 of the housing 14 and that the flange 42 of the conduit is secure in its location between the retainer 16 and the bushing 22.

Upon secure installation of the flange 42 as described above, the insertion verification tab 18 may then be removed by a user. If a user chooses not to remove the insertion verification tab 18, it will loosely remain in the hole 78 of the housing 14 in part because the tension in the tension post 68 has been removed and the land 72 of the hook 70 has been removed from the inside diameter 82 of the housing 14, but also because of the first nodule 74 and the second nodule 76. More specifically, the nodules 74, 76 prevent the insertion verification tab 18 from falling from the housing 14 because the distance between a first tip 96 of the first nodule 74 and a second tip 98 of the second nodule 76 is greater than a width 100 of the hole 78 through which the insertion verification tab 18 passes in order to be removed from the housing 14. However, because the insertion verification tab 18 may be molded or made from a plastic material that is compressible or deformable, the insertion verification tab 18 may be removed entirely from the housing 14 through the hole 78 by somewhat forcefully pulling on the button 60 of the insertion verification tab 18. In response to such pulling, the nodules 74, 76 will deform and pass through the hole 78 of the housing 14. Pulling the insertion verification tab 18 from the housing 14 is possible when the land 72 of the hook 70 no longer resides on the interior surface 88 of the housing 14, after being forced from such a position, as previously described.

Therefore, in one embodiment what is disclosed is a connector assembly employing the tubular housing 14 defining the groove or opening 28 through at least a portion of a wall of the housing 14, and the through hole 78. Additionally, the assembly may employ the retainer 16, such as a stainless steel spring wire retainer, that passes through the groove 28, and may employ the insertion verification tab 18 that passes through the through hole 78. The assembly may further employ the tubular conduit 12 defining the annular flange 42 that protrudes radially outwardly from the conduit 12, the flange 42 having a diameter that is larger than the tubular conduit 12.

Figure 25:
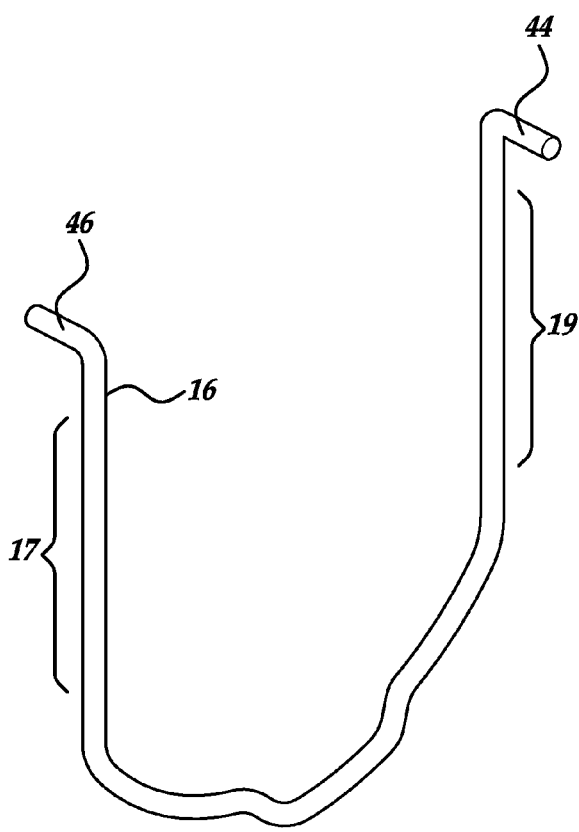
FIG. 25 is a perspective view of a retainer.

Optionally, the connector assembly may employ the annular bushing 22 positioned within the housing 14 such that the flange 42 of the tubular conduit 12 is positioned between the bushing 22 and the retainer 16. The annular O-ring 20 may reside against the bushing 22 on a side of the bushing 22 opposite the retainer 16. The groove 28 in the housing 14 may be formed at an angle other than ninety degrees relative to the longitudinal axis of the housing 14 to facilitate the passing of the flange 42 deeper into the housing 14. The angle of the groove 28 in the housing 14 may then prevent removal of the conduit 12 as the retainer 16 reaches a closed end of the groove 28. During insertion of the conduit 12, the flange 42 may contact a first side of the retainer 16, such as a side of the retainer 16 facing the insertion end (where the conduit 12 enters the housing 14) of the housing 14, and upon completion of insertion of the conduit 12, the flange 42 may contact a second side of the retainer 16, or that side of the retainer 16 not facing the end of the housing 14 where the conduit 12 enters the housing 14. Stated differently, during insertion of the conduit 12, the flange 42 may contact a first side of the retainer 16 and upon completion of insertion of the conduit 12, that is, when the land 72 of the hook 70 of the insertion verification tab 18 is forced into the hole 78, the flange 42 contacts a second side of the retainer 16. The retainer 16 may be a spring steel wire that biases into and out of the groove 28 of the housing 14, and has first and second portions 17, 19 (FIG. 25) that are locatable in and out of the fluid passage 48, during insertion of the conduit 12 into the housing 14 due to the flange 42 contacting the retainer 16.

The insertion verification tab 18 may employ the main stalk 62 with a first end (the end with the disc or button 60) and a second end (the end with the hook 70). The disc 60, which may be molded to the first end of the main stalk 62, may be used for grasping by human fingers to extract the stalk 62 from the housing after full insertion of the conduit 12, as described above. The hook 70 with the flat land 72 may be molded to the second end of the main stalk 62, and the first tension tab 64 and the second tension tab 66 may be molded to the main stalk 62 between the disc 60 and the hook 70. The first tension tab 64 and the second tension tab 66 may be arched such that only an edge or tip of each, such as that portion of each most distal to the stalk 62, is closest to the housing 14 before insertion of the stalk 62 into the housing 14, so that they act as springs and flex to place part of the stalk 62 into tension when the tabs 64, 66 are pressed against the housing 14, with part of the tabs 64, 66 still connected to the stalk 62, and the land 72 of the hook 70 is contacting the inside surface 88 of the housing 14. The first and second tension tabs 64, 66 may be forced flat against the top surface 80 of the housing 14 thereby creating tension in the main stalk between the first and second tension tabs 64, 66 and the hook 70.

The insertion verification tab 18 may further employ the first nodule and the second nodule located at the second end of the main stalk, or that end of the stalk with the hook 70. A distance between the first nodule tip 96 most distal from the main stalk and the second nodule tip 98 most distal from the main stalk is less than a shortest distance between opposing parallel sides of the through hole 78. The nodules 74, 76 and the walls of the hole 78 may deform to permit removal of the insertion verification tab 18 from the housing 14 after complete insertion of the conduit 12 into the housing 14 and the forcing by the flange 42 of the hook 70 into the hole 78. The stalk 62 may flex to permit such positioning of the hook 70 for removal of the stalk 62.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A quick connector assembly, comprising:
a housing for providing fluid communication between a first conduit with a flange and a second conduit, said housing having a first end that connects with the first conduit and having a second end that connects with the second conduit, said housing having a fluid passage extending between said first and second ends, said housing having a through-hole located therein, and said housing having an opening located therein, said opening being open to said fluid passage;
a retainer carried by said housing, said retainer located in said fluid passage via extension through said opening; and
a tab extended through said through-hole and located within said fluid passage of said housing forward of said retainer with respect to the direction of connection of the first conduit, said tab also located exteriorly of said housing;
wherein, when connecting said housing and the first conduit, the flange of the first conduit contacts said retainer and displaces said retainer outwardly with respect to said fluid passage of said housing and displaces said retainer forwardly with respect to the direction of connection of the first conduit, during further connection the flange passing said retainer such that said retainer springs inwardly and rearwardly against the first conduit wherein abutment between the flange and said retainer inhibits separation of said housing and the first conduit, the flange of the first conduit contacts said tab and displaces said tab outwardly with respect to said fluid passage of said housing;
wherein said tab includes a hook, a first tension tab, and a second tension tab, said hook bearing against a fluid passage wall of said housing when said tab is extended through said through-hole and located within said fluid passage, said first and second tension tabs having an unflexed position when said tab is not extended through said through-hole and is not located within said fluid passage, and said first and second tension tabs having a flexed position when said hook bears against said fluid passage wall, wherein, when connecting said housing and the first conduit, the flange of the first conduit contacts said hook and displaces said hook outwardly with respect to said fluid passage, and said first and second tension tabs move toward their unflexed position and facilitate displacement of said hook.

2. A quick connector assembly as defined in claim 1, wherein said second end of said housing is constructed as a nipple with a plurality of barbs located thereon, said first conduit is a metal pipe received within said first end of said housing, and said second conduit is a hose fit over said second end of said housing.

3. A quick connector assembly as defined in claim 1, wherein said opening is shaped to permit forward displacement of said retainer with respect to the direction of connection of the first conduit, and is shaped to prevent rearward displacement of said retainer with respect to the direction of connection of the first conduit.

4. A quick connector assembly as defined in claim 1, wherein said opening is defined in part by confronting first and second opening surfaces that i) are angled with respect to a longitudinal axis of said housing, ii) permit forward displacement of said retainer with respect to the direction of connection of the first conduit, and iii) prevent rearward displacement of said retainer with respect to the direction of connection of the first conduit.

5. A quick connector assembly as defined in claim 1, wherein said housing has a second opening located therein, said retainer extended through said second opening and located in said fluid passage of said housing, and, when connecting said housing and the first conduit, the flange of the first conduit contacts said retainer and displaces said retainer outwardly with respect to said fluid passage, and during further connection the flange passing said retainer such that said retainer springs inwardly against the first conduit wherein abutment between the flange and said retainer inhibits separation of said housing and the first conduit.

6. A quick connector assembly as defined in claim 1, wherein said retainer is a wire spring wrapped around at least a portion of said housing, said wire spring having a pronged end seated in a recess of said housing before and after connection of the housing and the first conduit.

7. A quick connector assembly as defined in claim 6, wherein said wire spring is generally u-shaped with a first leg and a second leg, said housing has a first opening and a second opening located therein and open to said fluid passage, said first leg extended through said first opening and located in said fluid passage of said housing, said second leg extended through said second opening and located in said fluid passage of said housing, and, when connecting said housing and the first conduit, the flange of the first conduit contacts said second leg and displaces said second leg outwardly with respect to said fluid passage, and during further connection the flange passing said second leg such that said second leg springs inwardly against the first conduit wherein abutment between the flange and said second leg inhibits separation of said housing and the first conduit.

8. A quick connector assembly as defined in claim 1, further comprising a bushing located within said fluid passage of said housing, said bushing facilitating connection of said housing and the first conduit.

9. A quick connector assembly as defined in claim 1, further comprising an o-ring located within said fluid passage of said housing, said o-ring forming a seal between said housing and the first conduit when said housing and the first conduit are connected.

10. A quick connector assembly, comprising:
a housing constructed to provide fluid communication between a conduit with a flange and a hose, said housing having a fluid passage and having an opening in a wall of said housing, said opening being open to said fluid passage, said housing having a through-hole located therein;
a wire spring wrapped externally around at least a portion of said housing, said wire spring extended through said opening and located within said fluid passage of said housing; and
a tab having a hook and a tension tab, said hook extended through said through-hole and located within said fluid passage of said housing and bearing against a fluid passage wall of said fluid passage, said tension tab located exteriorly of said fluid passage, said tension tab flexing when said hook bears against said fluid passage wall, and said tension tab bearing against an exterior surface of said housing when said tension tab is flexed;
wherein, when receiving the conduit, the flange of the conduit contacts said wire spring and displaces said wire spring outwardly with respect to said fluid passage of said housing and displaces said wire spring forwardly with respect to the direction of reception of the conduit, and during further reception the flange passing said wire spring such that said wire spring springs inwardly and rearwardly against the conduit, wherein abutment between the flange and said wire spring and abutment between said wire spring and a surface of said opening inhibits separation of said housing and the conduit, the flange of the conduit contacts said hook of said tab and displaces said hook outwardly with respect to said fluid passage and displaces said hook at least partly into said through-hole, said tension tab bearing against said exterior surface when flexed facilitating displacement of said hook.

11. A quick connector assembly as defined in claim 10, wherein said housing has a first end that receives the conduit and has a second with a plurality of barbs located on an exterior thereof that is inserted into the hose.

12. A quick connector assembly as defined in claim 10, wherein abutment between said wire spring and said surface of said opening prevents additional rearward displacement of said wire spring with respect to the direction of reception of the conduit after the conduit is received in said housing.

13. A quick connector assembly as defined in claim 10, further comprising a bushing located within said fluid passage of said housing, said bushing facilitating reception of the conduit.

14. A quick connector assembly as defined in claim 10, further comprising an o-ring located within said fluid passage of said housing, said o-ring forming a seal between the conduit and said housing when the conduit is received in said housing.

15. A quick connector assembly, comprising:
a housing constructed to provide fluid communication between a conduit with a flange and a hose, said housing having a first end that receives the conduit and having a second end that is inserted into the hose, said housing having a fluid passage extending between said first and second ends, said housing having a first opening, a second opening, and a through-hole;
a wire spring carried by said housing, said wire spring having a first leg extended through said first opening and located within said fluid passage of said housing, and said wire spring having a second leg extended through said second opening and located within said fluid passage of said housing; and
a tab extended through said through-hole and located within said fluid passage of said housing forward of said first and second legs of said wire spring with respect to the direction of reception of the conduit, said tab also located exteriorly of said housing;
wherein, when receiving the conduit, the flange of the conduit contacts said first and second legs of said wire spring and displaces said first and second legs outwardly with respect to said fluid passage of said housing and displaces said first and second legs forwardly with respect to the direction of reception of the conduit, during further reception the flange passing said first and second legs such that said first and second legs spring inwardly and rearwardly against the conduit, the flange of the conduit contacts said tab and displaces said tab outwardly with respect to said fluid passage of said housing, during further reception the flange passing said tab;
wherein said tab includes a hook, a first tension tab, and a second tension tab, said hook bearing against a fluid passage wall of said housing when said tab is extended through said through-hole and located within said fluid passage, said first and second tension tabs having an unflexed position when said tab is not extended through said through-hole and is not located within said fluid passage, and said first and second tension tabs having a flexed position when said hook bears against said fluid passage wall, wherein, when connecting said housing and the first conduit, the flange of the first conduit contacts said hook and displaces said hook outwardly with respect to said fluid passage, and said first and second tension tabs move toward their unflexed position and facilitate displacement of said hook.

16. A quick connector as defined in claim 15, further comprising a bushing located within said fluid passage of said housing, said bushing facilitating reception of the conduit.

17. A quick connector as defined in claim 16, further comprising an o-ring located within said fluid passage of said housing, said o-ring forming a seal between the conduit and said housing when the conduit is received in said housing.

\* \* \* \* \*